No. 794,812. PATENTED JULY 18, 1905.
G. PAHL & W. J. RAHN.
CLOTHES LINE CLAMP.
APPLICATION FILED AUG. 19, 1904.
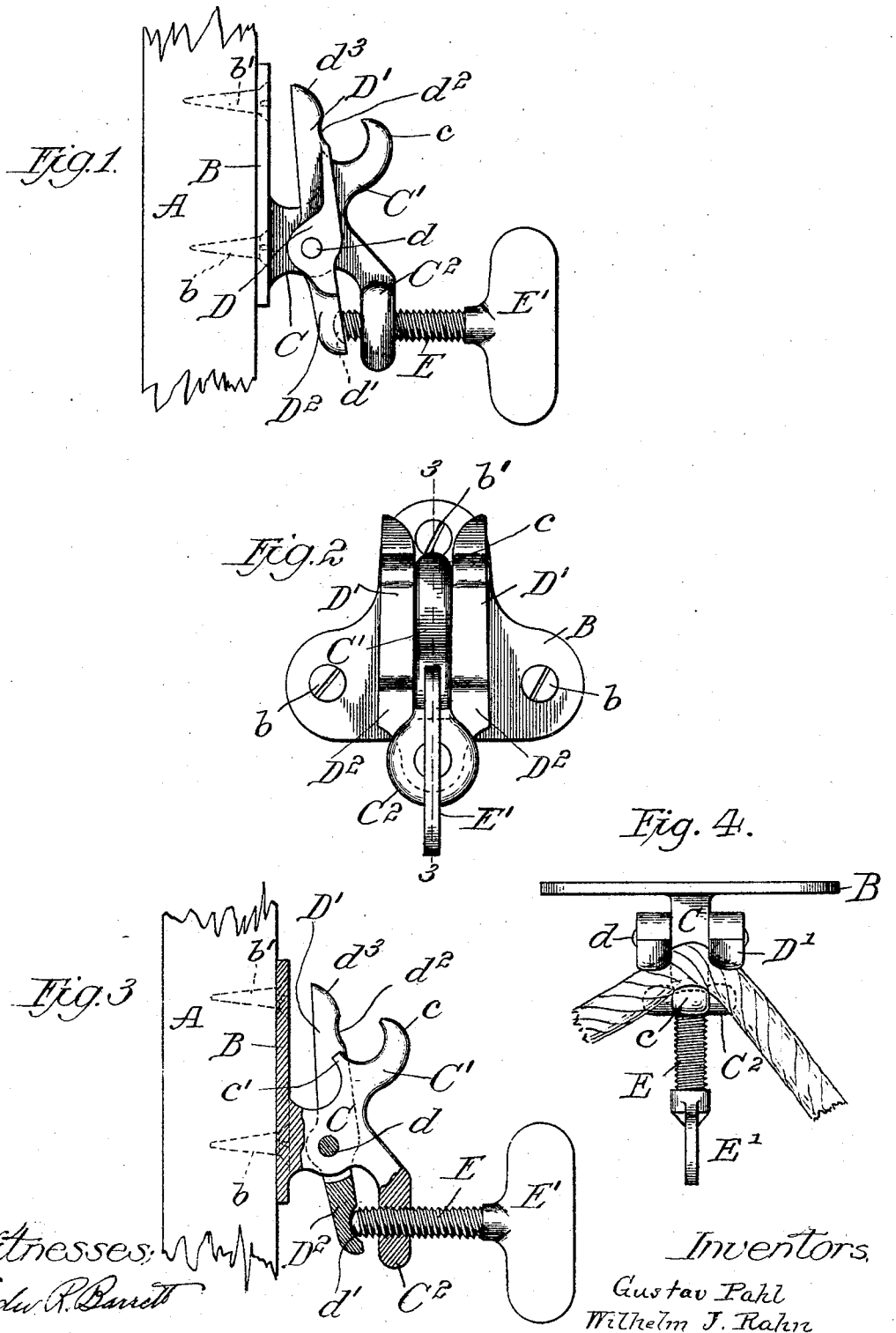

No. 794,812. Patented July 18, 1905.

UNITED STATES PATENT OFFICE.

GUSTAV PAHL AND WILHELM J. RAHN, OF CHICAGO, ILLINOIS, ASSIGNORS OF ONE-THIRD TO OTTO RHOEDE, OF CHICAGO, ILLINOIS.

CLOTHES-LINE CLAMP.

SPECIFICATION forming part of Letters Patent No. 794,812, dated July 18, 1905.

Application filed August 19, 1904. Serial No. 221,405.

*To all whom it may concern:*

Be it known that we, GUSTAV PAHL and WILHELM J. RAHN, citizens of the United States, and residents of Chicago, in the county of Cook and State of Illinois, have invented certain new and useful Improvements in Clothes-Line Clamps; and we do hereby declare that the following is a full, clear, and exact description thereof, reference being had to the accompanying drawings, and to the letters of reference marked thereon, which form a part of this specification.

This invention relates to a novel device in the nature of a clothes-line hook or clamp, the same being a device adapted for attachment to a fence, post, or other support and provided with clamping-jaws arranged to form an upwardly-opening notch or recess to receive the clothes-line and by which the same may be gripped or clamped either at its ends or between its ends to hold the line stretched or taut.

The invention consists in the matters hereinafter set forth, and more particularly pointed out in the appended claims.

As shown in the accompanying drawings, Figure 1 is a view in side elevation of a clothes-line clamp embodying our invention. Fig. 2 is a face view thereof. Fig. 3 is a sectional view taken on line 3 3 of Fig. 2. Fig. 4 is a plan or top view of the clamp, showing the clamping-jaws in their closed or clamping position with the clothes-line engaged therewith.

As shown in said drawings, A designates a part of a fence, a post, or other support to which the clamp is attached.

B indicates the base-plate of the clamp, which is secured by screws $b$ $b$ $b'$ to the said support A.

C indicates the body or shank of the clamp, which is preferably made in one piece or integral with the base B. Said body or shank C extends horizontally outwardly from the base-plate B, preferably near the lower edge of the latter, and is provided with an upwardly-extending arm $C'$ and a downwardly-extending arm $C^2$. The arm $C'$ is made of hook shape at its upper end to receive or hold a line engaged therewith, as when a loop of the line is thrown over or behind the same and the line drawn taut. As shown in the accompanying drawings and as a convenient form of construction in these parts, the said arm $C'$ is provided at its upper end with a prong $c$, the inner edge of which is concave, and a prong $c'$, which projects inwardly and forms, with the said prong $c$, an upwardly and inwardly facing notch, said prong $c'$ constituting a support on which the line rests when looped over the prong $c$. The inner and upper edges of said prongs $c$ and $c'$ constitute an upwardly and rearwardly facing concave recess or notch adapted to receive the clothes-line.

Pivoted to the shank or body C by means of a transverse pivot $d$ is a clamp-lever D, the upper part of which lever is divided or forked to form two arms $D'$ $D'$, arranged parallel with each other and extending at opposite sides of the shank C, with their upper ends extending to the top of or above the prong $c$ on said shank rearwardly of said prong. The pivot $d$ passes through the said shank C and through the opposite arms $D'$ $D'$ of the clamp-lever near the lower end or base of the same. Below the shank C the clamp-lever is provided with a single downwardly-extending arm $D^2$.

E is a horizontally-arranged actuating-screw which extends through the arm $C^2$ of the shank C and bears against the outer face of the arm $D^2$ of the clamp-lever. Said arm $D^2$ is preferably provided with a recess or cavity $d'$ to receive the inner end of the screw E. Said screw is provided at its outer end with a thumb-piece $E'$, by which the screw may be easily turned, and said screw is preferably made double-threaded, so that its threads shall have considerable pitch.

The upper ends of the arms $D'$ $D'$ of the clamp-lever constitute, with the hook-like prong $c$ of the arm $C'$, clamping-jaws by which the clothes-line is held or clamped. To facilitate the engagement of said arms $D'$ $D'$ with the line, said arms are preferably provided in their forward faces with depressions or notches $d^2$, arranged opposite the concave inner face of the prong $c$. To aid in the insertion of the line into place between the clamp-jaws when the line is being engaged with the clamp, the arms D' D' of the clamp-lever are extended above the upper end or prong $c$ of the arm C', so that when a loop of the line is thrown inwardly over the top of said prong $c$ it will strike the upper ends of said arms D' D' and will be guided thereby downwardly into place behind the said prong $c$ as the loop of the line is tightened around the said prong. Preferably the upper ends of the said arms D' D' are provided with curved outer margins $c^3$ to aid in guiding the line into place between the clamp-jaws when a loop of the line is thrown over the said prong $c$. The arm C' constitutes the stationary part or member of the clamp, while the arms D' D', which rise from the pivot of the clamp-lever at either side of and at the rear of the prong $c$, constitute the movable member of such clamp. The arms D' D', arranged to act in connection with the centrally-arranged or intermediate stationary clamping member C', constitute a strong and effective gripping device for holding a clothes-line, it being obvious that the arms D' D' when forced forward toward the prong $c$ tend to bend or flex the line around the said prong and to thereby grip or hold the same in a manner to prevent possibility of the slipping of the line through the clamp.

The operation of the device described is as follows: The jaws of the clamp are opened by turning backwardly the screw E, so as to permit the upper ends of the arms D' D' of the clamp-lever D to swing backwardly from the upper hooked end or prong $c$ of the arm C'. An opening will thus be formed into which the line may be inserted between the clamp-jaws formed by said prong $c$ and the upper ends of said arms D' D'. The line having been so placed between the clamp-jaws, it is then drawn taut or tightened and the screw E then turned so as to bring the upper ends of the arms D' D' forward to clamp the line. The plan view, Fig. 4, shows the position of the clamp-jaws when engaged with the line, it being obvious from this figure that the upper ends D' D' of the clamp-lever engage the line at the opposite sides of the prong $c$ and by bending the line abruptly around said prong serve to strongly and firmly clamp the same or hold the line from slipping through the clamp.

Assuming several of the clamps described are employed and secured to supports at different parts of the yard or space in which the line is to be stretched, one end of the line may be secured in place by engagement therewith of one of the clamps. The line may be then carried to another clamp, hooked over or around the prong $c$ thereof, drawn tight, and clamped to prevent it becoming slack. The line may then likewise be carried around a third clamp, drawn tight, and clamped, and the same proceeding repeated until the end of the opposite end of the line is reached, when such opposite end may be likewise secured by means of one of the clamps.

The screws $b\ b$, by which the base-plate B is secured to the supports for the clamps, are preferably arranged at opposite sides of the shank, while the third screw $b'$ is preferably arranged above the top of the shank, this construction having the advantage that the strain coming upon the hooked arm $c$ is resisted or carried by all of said screws.

We claim as our invention—

1. A device for the purpose set forth comprising a stationary part or shank provided with an upwardly-extending hooked arm constituting one member of a clamp, and a clamp-lever pivoted to said shank and having two arms located at opposite sides of said hooked arm and which constitutes the other member of said clamp, and means engaging one of said clamp members and acting on the other clamp member to force said arms of the clamp-lever toward said hooked arm.

2. An article for the purpose described comprising a stationary part or shank provided with a downwardly-extending arm and an upwardly-directed hooked arm, a clamp-lever pivoted to the shank and provided with two parallel arms located at opposite sides of the said shank and through which extends the pivot by which the lever is pivoted to the shank, said arms extending upwardly from said pivot at opposite sides, and at the rear, of said hooked arm and forming with said hooked arm a clamp, and means engaging the downwardly-extending arm on the shank and acting on the lower end of said clamp-lever for forcing the upper ends of said arms of the clamp-lever forwardly toward the hooked arm.

3. A device for the purpose set forth comprising a stationary part or shank provided with an upwardly-extending hooked arm shaped to form an upwardly and inwardly facing line-receiving notch and constituting one member of a clamp, a clamp-lever pivoted to the shank and having two parallel arms which extend upwardly from the pivot of the clamp-lever at either side and at the rear of the said hooked arm and constitute the other member of the clamp, and means engaging one of said members and acting on the other member to bring the clamp members together, the upper ends of said arms of the clamp-lever being extended above said hooked arm to constitute a means for guiding the line in inserting it into said line-receiving notch.

4. A device for the purpose set forth comprising a stationary part or shank provided with a downwardly-extending arm and with an upwardly-extending hooked arm shaped to form an upwardly and inwardly facing notch and constituting one member of a clamp, a clamp-lever pivoted to said shank and having two parallel arms which rise from the pivot of the lever at opposite sides and at the rear of said hooked arm and constitute the other member of said clamp, and a screw engaging the downwardly-extending arm on the shank and acting on the lower end of the clamp-lever for forcing the upper ends of the said clamp-lever forwardly toward the said hooked arms.

In testimony that we claim the foregoing as our invention we affix our signatures, in presence of two witnesses, this 17th day of August, A. D. 1904.

GUSTAV PAHL.
WILHELM J. RAHN.

Witnesses:
C. CLARENCE POOLE,
GEORGE RAYMOND WILKINS.